(No Model.)
H. C. SWAN.
FIFTH WHEEL.
No. 534,126. Patented Feb. 12, 1895.
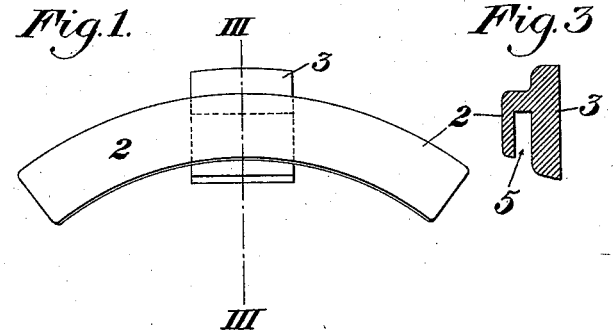
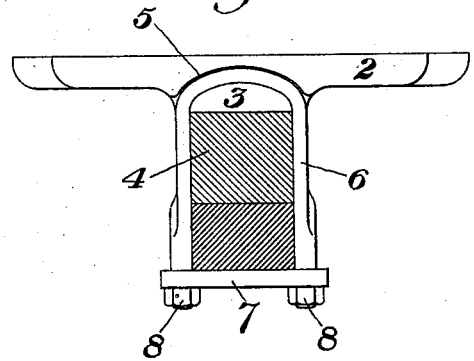
WITNESSES
INVENTOR
Henry C. Swan
by N. Bakewell & Sons
his attorneys

UNITED STATES PATENT OFFICE.

HENRY C. SWAN, OF OSHKOSH, WISCONSIN.

FIFTH-WHEEL.

SPECIFICATION forming part of Letters Patent No. 534,126, dated February 12, 1895.

Application filed August 4, 1894. Serial No. 519,476. (No model.)

*To all whom it may concern:*

Be it known that I, HENRY C. SWAN, of Oshkosh, in the county of Winnebago and State of Wisconsin, have invented a new and useful Improvement in Fifth - Wheels, of which the following is a full, clear, and exact description, reference being had to the accompanying drawings, forming part of this specification, in which—

Figure 1 is a top plan view of my improved fifth-wheel plate. Fig. 2 is a side elevation of the same in place upon an axle; and Fig. 3 is a cross section upon the line III—III of Fig. 1.

My invention relates to the class of fifth wheels known to the trade as "Derby" fifth wheels, and may be employed with a full circle, or any part thereof, it consisting in an improved means for securing the fifth-wheel to the axle.

In the drawings, 2 represents the circle plate of a fifth wheel, in this case a quarter circle being used. This circle plate is provided with an integral bearing or rest 3, which extends laterally upon each side of the plate, increasing the surface bearing upon the axle stock, and making it firm and secure in its place. To secure the plate to the axle-stock 4, I recess the same on one side at 5, thus providing a curved recess within which fits a clip 6 of ordinary construction, having clip tie 7 and securing nuts 8.

The advantages of the invention will be apparent to those skilled in the art. The clip is in the same relative position to the circle plate as if forged solid therewith, while a cast metal may be used in the circle plate and a wrought metal in the clip. This enables me to use a hard metal in the circle plate which will resist frictional wear to a much greater extent than wrought iron, and at the same time give the proper grade of iron for a clip upon which threads may be cut without danger of breakage. The plate is also much more easily made and gives a firmer bearing upon the axle than formerly.

I claim—

1. A fifth-wheel plate, having a clip recess in its side, substantially as described.

2. A fifth-wheel plate, having a bearing extending beyond the side edges of the plate, and provided on one side with a clip recess; substantially as described.

3. A fifth wheel having a clip recess in one side between its upper and lower surfaces, substantially as described.

In testimony whereof I have hereunto set my hand.

HENRY C. SWAN.

Witnesses:
GEO. B. SHEPARD,
MARTIN O. SENSENY.